United States Patent [19]

McClure

[11] 3,750,488

[45] Aug. 7, 1973

[54] HANDBRAKE APPARATUS

[75] Inventor: Glenn T. McClure, McKeesport, Pa.

[73] Assignee: Westinghouse Air Brake Company, Wilmerding, Pa.

[22] Filed: Jan. 17, 1972

[21] Appl. No.: 218,179

[52] U.S. Cl............................ 74/337, 74/506, 74/508, 254/187 R
[51] Int. Cl............................ F16h 5/54, G05g 1/08
[58] Field of Search.................... 74/337, 506, 508; 254/169, 187 R

[56] References Cited
UNITED STATES PATENTS

| | | | |
|---|---|---|---|
| 914,284 | 3/1909 | Jones | 74/508 |
| 1,300,474 | 4/1919 | O'Connor | 74/508 X |
| 1,729,626 | 10/1929 | O'Connor | 74/508 X |
| 3,167,272 | 1/1965 | Frode | 74/337 X |

Primary Examiner—Allan D. Herrmann
Attorney—Ralph W. McIntire, Jr.

[57] ABSTRACT

This invention relates to a railway car hand brake apparatus having a spring-biased friction clutch to provide for automatic change from high to low speed drive of a driven member by a drive member upon engagement of the brake shoes with the tread surface of the corresponding wheels in response to the manual rotation of a hand brake wheel. Until the brake shoes engage the tread surface of the wheels, the driven member, which carries thereon a drum upon which a hand brake chain is wound, is driven at fast speed through the friction clutch from the drive member that constitutes a drive shaft and a hand wheel keyed thereto. Slippage of the clutch occurs upon the shoes engaging the tread surface of the wheels, whereupon the drum is driven at a slow speed through a gear train interposed between the driven member to which the drum is keyed and the drive shaft.

9 Claims, 2 Drawing Figures

HANDBRAKE APPARATUS

BACKGROUND OF THE INVENTION

Railway car hand brake mechanisms are in common use, mainly for the stopping and parking of an individual car while its fluid pressure brake system is disconnected from that of a train and therefore inoperative. Generally, a hand brake application is effected by manual rotation of a hand wheel to wind up a chain connected at one end to a power multiplying brake linkage through which a braking force is transmitted to the brake shoes to thereby press them against the tread surface of the corresponding wheels to stop the car. Power multiplication by the linkage requires large chain travel to produce a correspondingly small brake shoe travel. This large chain travel requires an excessive number of turns of the hand wheel to effect a brake application. This is particularly true whenever the hand brake mechanism has been released by a quick release means provided with most hand brake mechanisms as substantial slack in the chain occurs when the quick release means is operated. Accordingly, effecting a hand brake application on the car becomes time-consuming unless the chain slack can be quickly taken up in response to the initial manual rotation of the hand brake wheel.

SUMMARY OF THE INVENTION

According to the present invention, a novel automatic two-speed hand brake mechanism is provided which comprises a spring-biased friction-type of clutch and a four-member gear train to provide, prior to slippage of the friction clutch and before the brake shoes are brought into braking contact with the tread surface of the corresponding wheels, a high-speed direct drive between a hand wheel and a drum upon which a hand brake chain is wound, independent of the gear train, to cause a rapid take-up of the chain upon initial manual rotation of the hand brake wheel. A drive shaft rotatable by the hand wheel carries thereon a ratchet wheel that drives the clutch through a plurality of pawls carried by a sleeve member that also carries the clutch. Upon slipppage of the friction clutch, one gear carried on the drive shaft drives via the other gears of the gear train and a second set of pawls, the drum at a slow speed of rotation that is dependent upon the number of teeth on the several gears comprising the gear train. Since the torque transmitted from the driving gear to the driven gear of the gear train and therefore the drum varies inversely as the speed of these two gears, continued rotation of the hand wheel at the same speed, subsequent to slippage of the friction clutch, transmits a high torque to the hand brake chain to wind it upon the drum.

Figure 1:
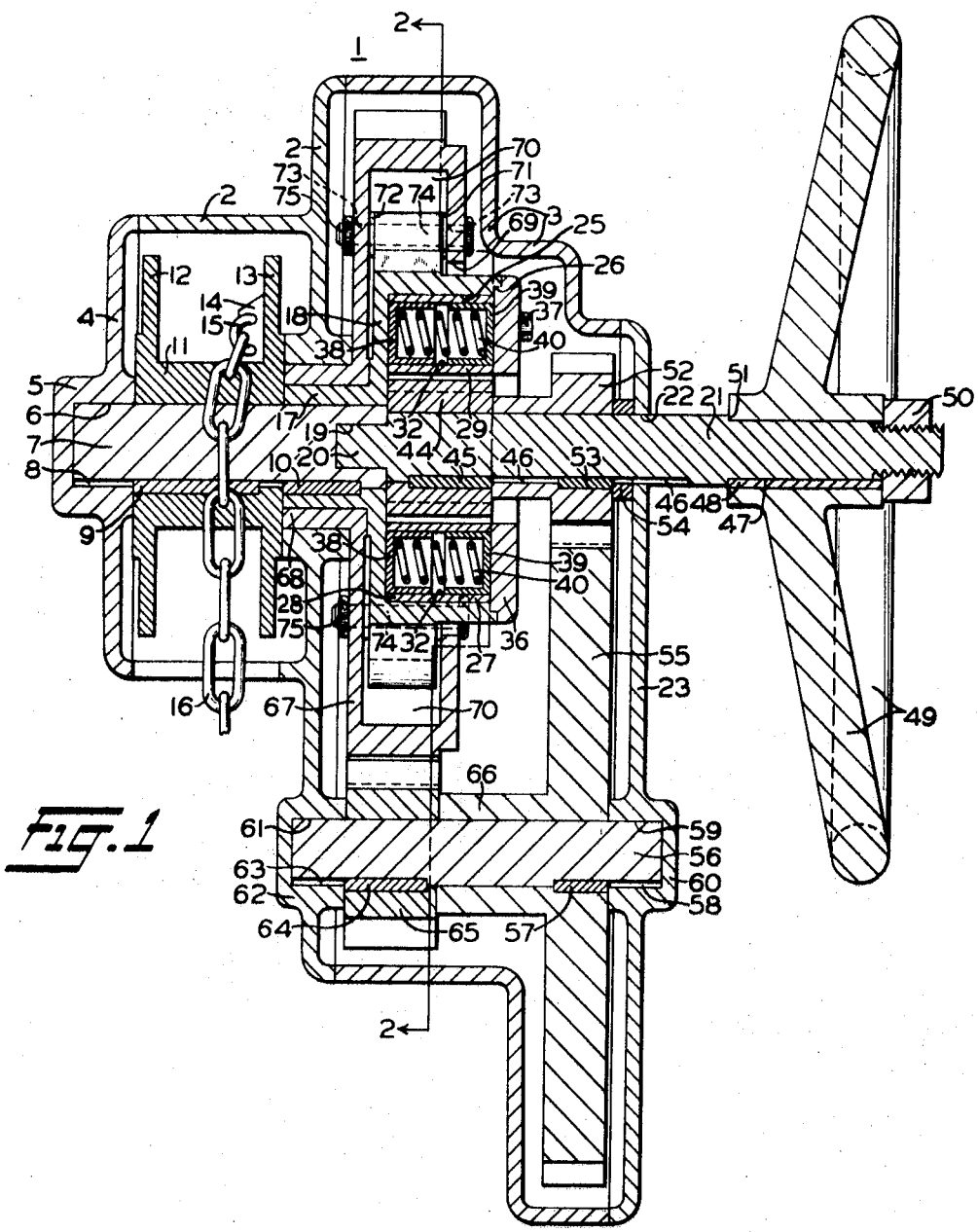
FIG. 1 is a vertical cross-sectional view, taken along the line 1—1 of FIG. 2 and looking in the direction of the arrows, of a hand brake operating mechanism for a railway car.

Referring to the drawings, a hand brake operating mechanism 1 embodying the invention is contained in a sectionalized casing comprising a pair of abutting casing sections 2 and 3 that are secured together by any suitable means (not shown). The casing section 2 may be provided with some suitable means (not shown) for receiving such as, for example, attachment bolts or the like (not shown) to secure this casing section to a railway car.

As shown in FIG. 1 of the drawings, the left-hand end of the casing section 2 has secured thereto by any suitable means (not shown) a first end cover 4 that has formed integral therewith a central boss 5 in which is provided a bottomed bore 6 for receiving one end of a driven shaft 7. This shaft 7 is provided with a key-way 8 that extends inward from its left-hand end to receive therein two spaced-apart keys 9 and 10.

The key 9 serves to connect a brake chain winding drum 11 having integral therewith a pair of spaced-apart flanges 12 and 13 to the driven shaft 7 so that this drum is rotatable with the shaft 7.

Formed integral with the left-hand side of the flange 13 is an anchor member 14 to which is secured, as for example, by welding, a U-shaped chain anchor 15 that serves to connect one end of a hand brake chain 16 to the drum 11 which chain is wound onto this drum whenever the brakes are applied by means of the hand brake operating mechanism 1 in a manner hereinafter described.

As shown in FIG. 1, the key 10 serves to connect a hub 17 that is integral with a ratchet wheel member 18 hereinafter described in detail to the driven shaft 7 so that the member 18 and shaft 7 are rotatable together, it being noted that the left-hand end of the hub 17 abuts the right-hand end of the drum 11.

The right-hand end of the driven shaft 7 is provided with a bottomed bore 19 in which is rotatably mounted a portion 20 of reduced diameter formed on the left-hand end of a hand wheel drive shaft 21 that extends through a bore 22 provided therefor in a second end cover 23 that is secured to the right-hand end of the casing section 3 by any suitable means (not shown), it being noted that the bottomed bore 19 in the driven shaft 7 and the bore 22 in the end cover 23 constitute bearings in which the drive shaft 21 is rotatably mounted. Furthermore, since the portion 20 of the drive shaft 21 is rotatably mounted in the bottomed bore 19 in the driven shaft 7, it can be seen from FIG. 1 that the bottomed bore 6 in the boss 5 of the first end cover 4 and the bore 22 in the second end cover 23 constitute two spaced-apart shaft bearings when the two shafts 7 and 21 are considered as a single shaft.

The ratchet wheel member 18 has formed on its outer periphery a plurality of ratchet teeth 24 (FIG. 2) and is provided with a bottomed bore 25 (FIG. 1) and a coaxial counterbore 26 which extend inward from the right-hand side thereof, as shown in FIG. 1. Rotatably mounted in the bottom bore 25 is an annular or sleeve-like friction clutch housing member 27 which will now be described in detail.

As shown in FIG. 1, the length of the annular clutch housing member 27 is substantially the same as the depth of the bottomed bore 25 and its outside diameter is such as to provide a turning fit within this bottomed bore. Furthermore, as best shown in FIG. 2 of the drawings, the annular clutch housing member 27 is provided with a pair of diametrically opposite and inwardly extending arcuate members 28 and 29, and a pair of diametrically opposite and inwardly extending clevises 30 and 31.

Each of the arcuate members 28 and 29 is provided with a pair of arcuately spaced-apart smooth bores 32 and 33 and a pair of arcuately spaced-apart screw-threaded bottomed bores 34 and 35. A stepped cover 36 is disposed in the hereinbefore-mentioned counterbore 26 so as to have a turning fit therein, and this cover is secured to each of the arcuate members 28 and 29 of the clutch housing member 27 by a pair of cap screws 37 that have screw-threaded engagement with the screw-threaded bottomed bores 34 and 35 in each of these arcuate members 28 and 29.

Prior to securing the stepped cover 36 to the clutch housing member 27 in the manner just explained, a pair of oppositely-disposed cup-shaped friction clutch elements 38 and 39 having a spring 40 interposed therebetween is placed in each of the bores 32 and 33 in the two arcuate members 28 and 29 that are integral with the annular clutch housing member 27. Accordingly, it can be seen from FIG. 1 that subsequent to securing the cover 36 to the clutch housing member 27, each spring 40 is effective to bias the corresponding cup-shaped clutch element 38 against the left-hand end of the bottomed bore 25 in the ratchet wheel member 18 and the corresponding cup-shaped clutch element 39 against the left-hand side of the cover 36 that is secured to the clutch housing member 27. Thus, the cup-shaped clutch elements 38 and 39 and the springs 40 constitute a friction driving clutch between the clutch housing member 27 and the ratchet wheel member 18 through which a limited amount of torque can be transmitted without slip from the clutch housing member 27 to the ratchet wheel member 18 when the clutch housing member 27 is rotated clockwise, as viewed in FIG. 2, in a manner hereinafter explained.

Figure 2:
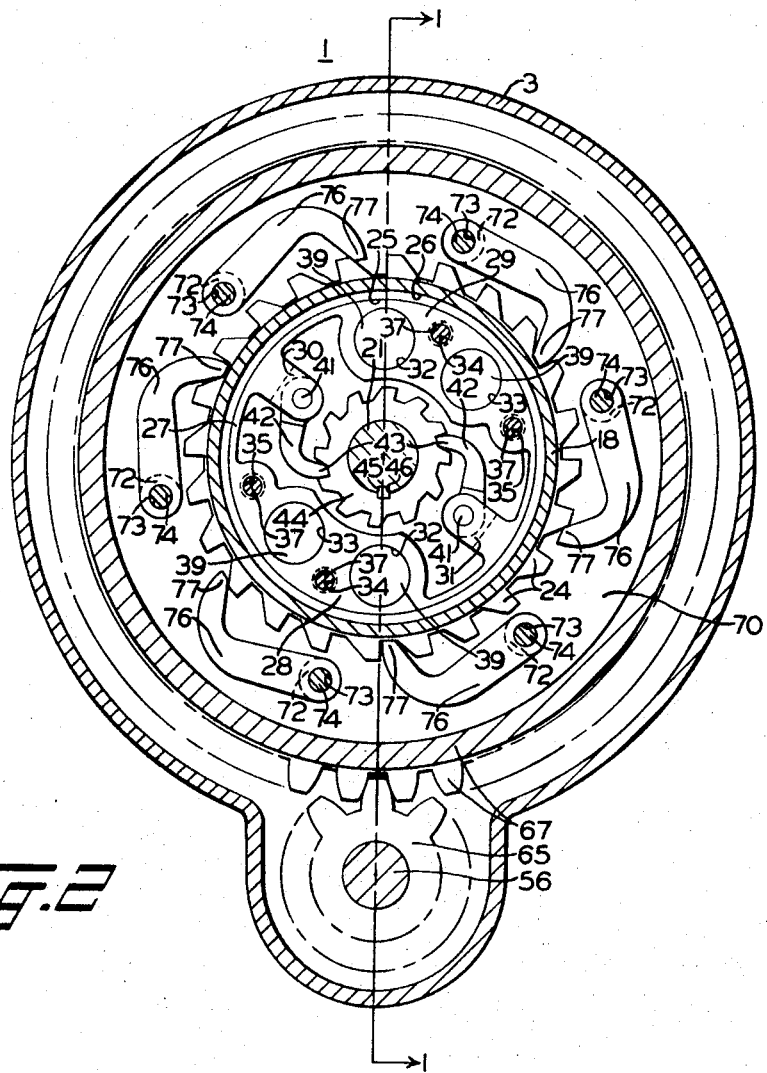
FIG. 2 is a vertical cross-sectional view, taken along the line 2—2 of FIG. 1 and looking in the direction of the arrows, showing further structural details of the hand brake operating mechanism shown in FIG. 1.

As shown in FIG. 2, anchored in the jaws of each of the clevises 30 and 31 are the opposite ends of a pin 41 on which is pivotally mounted a pawl 42. Each of the pawls 42 is provided with a pawl tip 43 which engage a tooth on a ratchet wheel 44 that is mounted on the hand wheel drive shaft 21 in abutting relation to the hub 17 and connected to this shaft 21 by a key 45 that is carried in a key-way 46 provided therefor in this shaft 21 intermediate the ends thereof. Adjacent its right-hand end, this shaft 21 is provided with a key-way 47 to receive a key 48 by which a hand wheel 49 is rigidly connected to this shaft. The right-hand end of the drive shaft 21 is provided with external screw threads for receiving nut 50 that clamps the hand wheel 49 against a shoulder 51 formed on this shaft at the left-hand end of the key-way 47.

For effecting rotation of the driven shaft 7 and the drum 11 to wind the hand brake chain 16 onto this drum subsequent to slipping of the friction clutch, which occurs upon the brake shoes engaging the tread surface of the corresponding wheels, a gear train is provided which will now be described. This gear train comprises a pinion 52 that is mounted on the drive shaft 21 in abutting relationship to the right-hand side of ratchet wheel 44 and is connected to the shaft 21 by a key 53 that is received in the above-mentioned key-way 46 in this shaft. A washer 54 disposed about the shaft 21 and interposed between the right-hand side of the pinion 52 and the left-hand side of the end cover 23 serves to retain the key 53 and pinion 52 on the shaft 21 in the position shown in FIG. 1.

A tooth of the pinion 52 always has a line of contact with a tooth of a large spur gear 55 that is mounted on a stub shaft 56 and connected thereto for rotation therewith by a key 57 that is received in a key-way 58 that extends inward from the right-hand end of this shaft 56.

As shown in FIG. 1, the right-hand end of the shaft 56 is journaled in a bottomed bore 59 provided in a boss 60 that is formed integral with the end cover 23, and the left-hand end of this shaft 56 is journaled in a bottomed bore 61 provided in a boss 62 that is integral with the casing section 2.

Extending inward from the left-hand end of the shaft 56 is a key-way 63 in which is received a key 64 that serves to connect a pinion 65 to this shaft 56, it being noted that this pinion 65 is disposed between the right-hand end of the boss 62 and the left-hand end of a hub 66 that is integral with the left-hand side of the hereinbefore-mentioned large gear 55.

As best shown in FIG. 2, a tooth on the pinion 65 always has a line of contact with a tooth on a large cast spur gear 67. This gear 67 has formed integral therewith a hub 68 which, as shown in FIG. 1, is rotatably mounted on the hub 17 that is integral with the ratchet wheel member 18, as aforestated.

As shown in FIG. 1 of the drawings, the right-hand side of the gear blank casting on which the teeth of the spur gear 67 are formed, as by a milling operation, is provided with a circular opening 69 that opens into a circular cavity or undercut 70 of larger diameter formed in this gear blank casting.

Each side of the circular cavity 70 is provided with six (6) arcuately spaced bosses, the bosses on the right-hand side of this cavity 70, as viewed in FIG. 1, being noted by the numeral 71 and those on the left by the numeral 72, it being noted that only the numerals indicating the bosses 72 appear in FIG. 2 of the drawings.

Each boss of each pair of bosses 71 and 72 extends in the direction of the other and is provided with a bore 73 that is coaxial with the corresponding bore in the other boss, it being noted that these bores 73 extend through the gear casting from one side thereof to the other to receive a bolt 74 the end of which receives a nut 75.

As best shown in FIG. 2, a pawl 76 is pivotally mounted on each of the bolts 74. It will be noted from FIG. 2 that the arcuate location or spacing of the bosses 72 and the bolts 74 is such that every other one of the pawls 76 substantially fully engages a ratchet tooth 24 on the ratchet wheel member 18. By this staggered arrangement of the pawls 76, it is apparent that should neither set of three pawls fully engage three teeth on the ratchet wheel member 18 at the time a trainman releases his grip on the hand wheel 49, subsequent to the hand brake chain bringing the brake shoes into braking contact with the tread surface of the corresponding wheels and the tightening of this chain by the trainman as much as possible to press the shoes against the tread surface of the wheels, the counterclockwise rotation or backlash, as viewed in FIG. 2, of the ratchet wheel member 18, and therefore the reduction in the force pressing the shoes against the wheels, is substantially one-half the amount that it would be were the bosses 72 and pawls 76 not staggered as shown.

OPERATION

It may be assumed, as an example, that the normal brake shoe clearance on a railway car provided with a hand brake mechanism constructed in accordance with the present invention is (1) one inch. Furthermore, it may be assumed that the hand brake chain 16 (FIG. 1)

must travel longitudinally a distance of (8) light inches in order to move the brake shoes a distance of (1) inch, or, in other words, the chain 16, as it is wound onto the drum 11, must move longitudinally a distance of (8) inches in order to bring the brake shoes into contact with the tread surfaces of the corresponding wheels.

In order to effect a manual application of the brakes, a trainman will rotate the hand wheel 49 in the direction to rotate the hand wheel drive shaft 21 in a clockwise direction, as viewed in FIG. 2 of the drawings, it being noted that the hand wheel 49 is connected to the drive shaft 21 by the key 48 (FIG. 1).

As shown in FIGS. 1 and 2, the ratchet wheel 44 is connected to the drive shaft 21 by the key 45, the pawl tip 43 of each of the two pawls 42 is disposed between two adjacent ratchet teeth on ratchet wheel 44, and each of these pawls 42 is mounted on a pin 41 the opposite ends of which are anchored in the jaws of the respective clevises 30 and 31 that are integral with the clutch housing member 27. Furthermore, the cover 36 (FIG. 1) is secured to the arcuate members 28 and 29 (FIG. 2), which are integral with the clutch housing member 27, by the cap screws 37, and the springs 40, as shown in FIG. 1, bias the friction clutch elements 39 against the left-hand side of the cover 36 and the friction clutch elements 38 against the end of the bottomed bore 25 in the ratchet wheel member 18.

In view of the above, it is apparent that clockwise rotation of the drive shaft 21 by the hand wheel 49 is effective to rotate the ratchet wheel member 18 in the same direction, this rotation of the drive shaft 21 being transmitted to this member 18 via the key 45, ratchet wheel 44, pawls 42, pins 41, clutch housing member 27, cover 36 and the friction clutch elements 38 and 39. Consequently, the ratchet wheel member 18 is rotated clockwise (FIG. 2) simultaneously with the drive shaft 21.

It should be noted that as the ratchet wheel member 18 is thus rotated clockwise, the pawls 76 will slide over the teeth 24 on the ratchet wheel member 18 since the gear 67 is being driven via the gear train at a slower speed than the ratchet wheel member 18 is being driven via the friction clutch elements 38 and 39.

As shown in FIG. 1, the hub 17, which is integral with the ratchet wheel member 18, is connected to the driven shaft 7 by the key 10 and the drum 11 is connected to this shaft 7 by the key 9. Therefore, manual rotation of the hand wheel 49 and drive shaft 21 in a clockwise direction, as viewed in FIG. 2, is effective to rotate the drum 11 at the same speed and in the same direction to wind the chain 16 onto this drum 11 until the brake shoes are brought into braking contact with the tread surface of the corresponding wheels, it being understood that this occurs when the chain 16 is wound onto drum 11 sufficiently to move a point on this chain a distance of eight (8) inches, as aforestated.

The additional resistance offered to further wind up of the chain 16 subsequent to the brake shoes being brought into braking contact with the tread surface of the corresponding wheels is sufficient to overcome the force exerted by the springs 40 to press the friction clutch elements 38 against the end of the bottomed bore 25 in the ratchet wheel member 18. Consequently, these clutch elements 38 will slip relative to the surface constituted by the end of the bottom bore 25 in the ratchet wheel member 18 so that this member 18 is no longer rotated at the same speed as the hand wheel 49 and the drive shaft 21. Therefore, chain 16 is no longer wound up at a fast speed.

It will be noted from FIGS. 1 and 2 that, (1) the pinion 52 is connected to the drive shaft 21 by the key 53 so that this pinion 52 is rotated with the hand wheel 49 and the drive shaft 21, (2) a tooth on the pinion 52 always has a line of contact with a tooth on the gear 55 which is connected to the shaft 56 by the key 57, (3) the pinion 65 is connected to the shaft 56 by the key 64, (4) a tooth on the pinion 65 always has a line of contact with a tooth on the gear 67, and (5) each of three pawls 76, which are carried by the gear 67 in the manner hereinbefore explained, have their pawl tips 77 substantially fully disposed between two adjacent ratchet teeth 24 of one of three pair of teeth on the periphery of the ratchet wheel member 18, the hub 17 of which is connected to the driven shaft 7 by the key 10. Consequently, it is apparent that the driven shaft 7 and the ratchet wheel member 18, the hub 17 of which is connected to this shaft 7 by the key 10, are driven from the drive shaft 21 via the gear train comprising pinions 52 and 65 and gears 55 and 67, and that the speed in revolutions per minute of the gear 67 is less than the speed in revolutions per minute of the pinion 52, it being understood that, subsequent to the selection of the number of teeth on the pinions 52 and 65 and on the gears 55 and 67, for any chosen number of revolutions per minute of the pinion 52, the corresponding revolutions per minute of the gear 67, the ratchet wheel member 18 and driven shaft 7 can be mathematically determined.

Moreover, it will be understood that, subsequent to the selection of the number of teeth on the pinions 52 and 63 and on the gears 55 and 67, the gear ratio of this gear train can be determined, and also that the force or pull exerted on the chain 16 for a given force exerted on the hand wheel 49 by a trainman is a multiple of the force exerted by the trainman on the hand wheel 49 which force on the chain 16 can be determined when the number of teeth on these gears and pinions is known. Consequently, the chain 16 transmits a force to the brake shoes so that these shoes are pressed against the tread surface of the corresponding wheels with a force that is a multiple of the force exerted by the trainman on the hand wheel 49 and is adequate to properly brake the car.

If it is desired to release the hand brake, the hand wheel 49 will be rotated in the direction to rotate the hand wheel drive shaft 21 in a counterclockwise direction, as viewed in FIG. 2. It is apparent from FIG. 2 that when the drive shaft 21 begins to be rotated in a counterclockwise direction, the pawl tips 43 of the pawls 42 will ride or slide along the inclined surface of the ratchet teeth on ratchet wheel 44 thereby nullifying the pull on the chain 16 and thus releasing the hand brake application.

Having now described the invention, what I claim as new and desire to secure by Letters Patent, is:

1. A hand brake apparatus for railway vehicles, the combination comprising:
   a. a driven shaft having mounted thereon a winding drum upon which a hand brake chain may be wound,
   b. a manually rotatable drive shaft, wherein the improvement comprises:
   c. a friction-type clutching means capable of slipping action and providing a direct high-speed driving connection through which said drive shaft drives said driven shaft in the absence of slipping action, said clutching means comprising:
  i. at least two oppositely-arranged clutch elements,
  ii. means carrying said at least two oppositely arranged clutch elements and having a one-way driving connection with said drive shaft whereby said at least two clutch elements are rotatable with said drive shaft upon rotation thereof in one direction, and
  iii. biasing means interposed between said at least two clutch elements for biasing one of said at least two clutch elements into frictional contact with said clutch-element-carrying means and the other of said at least two clutch elements into frictional contact with said driven shaft, and
  d. a gear train providing an indirect slow-speed driving connection through which said drive shaft drives said driven shaft upon the occurrence of slipping action of said clutching means.

2. A hand brake apparatus, as recited in claim 1, further characterized in said drive and driven shafts are coaxial and one end of said driven shaft constitutes a bearing for the adjacent end of said drive shaft.

3. A hand brake apparatus, as recited in claim 1, further characterized in that said gear train comprises:
  a. a first pinion rotatable with said drive shaft,
  b. a housing,
  c. a stub shaft journaled in said housing,
  d. a first gear mounted on said stub shaft for rotation therewith, one tooth of which always has a line of contact with one tooth of said first pinion,
  e. a second pinion mounted on said stub shaft for rotation therewith,
  f. a second gear rotatably mounted on said driven shaft, one tooth of which always has a line of contact with one tooth of said second pinion, and
  g. a one-way driving connection between said second gear and said driven shaft whereby rotation of said second gear in one direction, upon slipping of said clutching means, effects rotation of said driven shaft in the same direction to wind up said winding drum.

4. A hand brake apparatus, as recited in claim 3, further characterized in that said housing comprises three casing sections each of which is provided with a bearing, one end of said drive shaft and said driven shaft being journaled respectively in the bearing in two of said casing sections, and one gear of said gear train having a hub integral therewith journaled in the bearing in the other of said casing sections, said hub constituting a bearing for the other end of said driven shaft, and said other end of said driven shaft constituting a bearing for the other end of said drive shaft.

5. A hand brake apparatus, as recited in claim 1, further characterized in that each of said clutch elements comprises a cup-shaped cylinder, and said clutch-element-carrying means comprises a sleeve member having a pair of inwardly extending, diametrically arranged arcuate members integral therewith, each of which is provided with at least one bore for receiving two of said oppositely arranged cup-shaped cylinders and the respective biasing means interposed therebetween.

6. A hand brake apparatus, as recited in claim 1, further characterized in that said clutch-element-carrying means comprises a sleeve member having a pair of inwardly extending diametrically-arranged clevises on each of which is pivotally mounted a pawl, and said drive shaft has mounted thereon for rotation therewith a ratchet wheel for providing a driving connection with said pawls upon rotation of said drive shaft in only one direction whereby said friction-type clutching means is driven by said drive shaft upon rotation thereof in said one direction.

7. A hand brake apparatus, as recited in claim 6, further characterized in that said driven shaft has rigidly secured to its periphery a ratchet wheel, and one gear of said gear train carries a plurality of pawls pivotally mounted thereon in such arcuately spaced relationship that only certain of said pawls fully engage said ratchet wheel upon rotation of said one gear in only one direction for providing a driving connection between said one gear and said ratchet wheel to effect rotation of said driven shaft subsequent to the occurrence of slipping of said clutch elements, said arcuate spacing being effective to reduce backlash upon cessation of said one gear to drive said ratchet wheel.

8. A hand brake apparatus, as recited in claim 7, further characterized in that said ratchet wheel is provided with a hub mounted on and secured to said driven shaft and with a counterbore coaxial with said hub for receiving therein said sleeve member, and said one gear is provided with a hub rotatably mounted on the hub of said ratchet wheel and with an undercut coaxial with said hubs for receiving therein in unequal spaced-apart arcuate relation said pivoted pawls to provide a reduction in backlash upon cessation of said one gear to drive said ratchet wheel.

9. A hand brake apparatus, as recited in claim 1, further characterized in that each of said clutch elements comprises a cup-shaped cylinder, said clutch-element-carrying means comprises a sleeve member having a pair of inwardly extending, diametrically arranged arcuate members integral therewith, each of which is provided with at least one bore for receiving two of said oppositely arranged cup-shaped cylinders together with the respective biasing means interposed therebetween and a pair of inwardly extending, diametrically arranged clevises on each of which is pivotally mounted a pawl, and said drive shaft has mounted thereon for rotation therewith a ratchet wheel for providing a driving connection with said pawls upon rotation of said drive shaft in only one direction whereby said friction-type clutching means is driven by said drive shaft upon rotation thereof in said one direction, and said friction-type clutching means in turn driving said driven shaft until the driving resistance of said driven shaft produces slipping action of said clutching means.

* * * * *